(12) United States Patent
Quintero et al.

(10) Patent No.: US 10,822,537 B2
(45) Date of Patent: Nov. 3, 2020

(54) METHOD FOR REMOVING ORGANIC AND INORGANIC DEPOSITS IN ONE STEP

(71) Applicant: Baker Hughes, a GE company, LLC, Houston, TX (US)

(72) Inventors: Lirio Quintero, Houston, TX (US); Mary Jane Felipe, Sugar Land, TX (US)

(73) Assignee: Baker Hughes Holdings LLC, Houston, TX (US)

( * ) Notice: Subject to any disclaimer, the term of this patent is extended or adjusted under 35 U.S.C. 154(b) by 0 days.

(21) Appl. No.: 15/699,744

(22) Filed: Sep. 8, 2017

(65) Prior Publication Data

US 2018/0079951 A1 Mar. 22, 2018

Related U.S. Application Data

(60) Provisional application No. 62/394,325, filed on Sep. 14, 2016.

(51) Int. Cl.
*C09K 8/524* (2006.01)
*C09K 8/528* (2006.01)
*E21B 37/06* (2006.01)

(52) U.S. Cl.
CPC .............. *C09K 8/524* (2013.01); *C09K 8/528* (2013.01); *E21B 37/06* (2013.01)

(58) Field of Classification Search
None
See application file for complete search history.

(56) References Cited

U.S. PATENT DOCUMENTS

| | | | | |
|---|---|---|---|---|
| 3,402,770 A * | 9/1968 | Messenger | ............. | C09K 8/524 166/303 |
| 3,793,209 A * | 2/1974 | Thompson | ................ | C02F 5/10 507/235 |
| 4,120,356 A * | 10/1978 | Meister | .................... | C09K 8/22 166/267 |
| 4,207,193 A * | 6/1980 | Ford | ........................ | C11D 3/43 134/40 |
| 4,755,230 A | 7/1988 | Ashton et al. | | |
| 4,813,482 A | 3/1989 | Walton | | |
| 5,484,488 A | 1/1996 | Hart et al. | | |
| 7,188,676 B2 * | 3/2007 | Qu | ........................... | C09K 8/52 166/291 |
| 9,222,013 B1 | 12/2015 | Champagne et al. | | |
| 2002/0132740 A1 * | 9/2002 | Von Krosigk | ........... | C09K 8/52 507/200 |
| 2004/0063795 A1 | 4/2004 | Vonkrosigk et al. | | |
| 2006/0042795 A1 * | 3/2006 | Richards | ............... | E21B 34/063 166/278 |
| 2006/0096757 A1 * | 5/2006 | Berry | ....................... | C09K 8/40 166/291 |
| 2008/0287324 A1 * | 11/2008 | Pursley | .................... | C09K 8/52 507/218 |
| 2009/0075846 A1 | 3/2009 | Qu et al. | | |
| 2009/0183877 A1 * | 7/2009 | Quintero | ................ | C09K 8/584 166/300 |
| 2009/0325826 A1 * | 12/2009 | Quintero | .................. | C09K 8/58 507/259 |
| 2010/0130384 A1 | 5/2010 | Lightford et al. | | |
| 2010/0152069 A1 * | 6/2010 | Harris | ..................... | C09K 8/524 507/201 |
| 2014/0121137 A1 | 5/2014 | Andrecola | | |
| 2015/0101815 A1 * | 4/2015 | Soane | ..................... | C09K 8/524 166/303 |
| 2015/0203739 A1 | 7/2015 | Talley et al. | | |
| 2016/0024891 A1 * | 1/2016 | Fursdon-Welsh | ....... | E21B 37/06 166/300 |
| 2016/0145487 A1 * | 5/2016 | Alam | ..................... | C09K 8/524 507/209 |

FOREIGN PATENT DOCUMENTS

WO 2006104711 A2 10/2006

OTHER PUBLICATIONS

Schlumberger Oilfield Glossary, asphaltenes, retrieved Apr. 19, 2019 from https://www.glossary.oilfield.slb.com/Terms/a/asphaltenes.aspx (Year: 2019).*
Schlumberger Oilfield Glossary, gel, retrieved Apr. 19, 2019 from https://www.glossary.oilfield.slb.com/Terms/g/gel.aspx (Year: 2019).*
Schlumberger Oilfield Glossary, paraffin, retrieved Apr. 19, 2019 from https://www.glossary.oilfield.slb.com/Terms/p/paraffin.aspx (Year: 2019).*
Schlumberger Oilfield Glossary, colloidal suspension, retrieved Apr. 19, 2019 from https://www.glossary.oilfield.slb.com/Terms/c/colloidal_suspension.aspx (Year: 2019).*
Hydrochloric Acid Handbook, Jun. 2013, OxyChem, retrieved Nov. 20, 2019 from https://www.oxy.com/OurBusinesses/Chemicals/Products/Documents/hydrochloricacid/Hydrochloric_Acid_Handbook.pdf (Year: 2013).*

* cited by examiner

*Primary Examiner* — Angela M DiTrani Leff
(74) *Attorney, Agent, or Firm* — Mossman, Kumar & Tyler, P.C.

(57) ABSTRACT

Both organic deposits and inorganic deposits in a wellbore are simultaneously removed from a wellbore by contacting the deposits with a single phase fluid for an amount of time effective to simultaneously disperse the organic deposits and dissolve the inorganic deposits, where the single phase fluid includes least one solvent, at least one surfactant, at least one co-solvent, and at least one scale dissolver. The method further involves at least partially removing the organic deposits and inorganic deposits from the wellbore. In an embodiment where it is not necessary to remove inorganic deposits, the scale dissolver may be omitted.

19 Claims, 2 Drawing Sheets

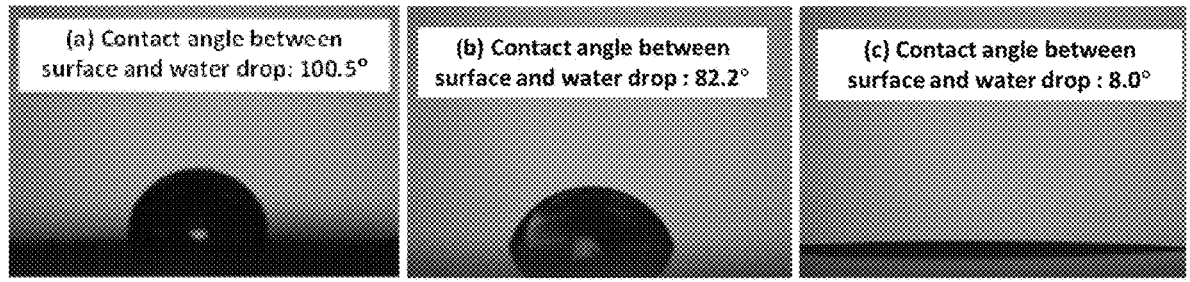
FIG. 1(a)  FIG. 1(b)  FIG. 1(c)
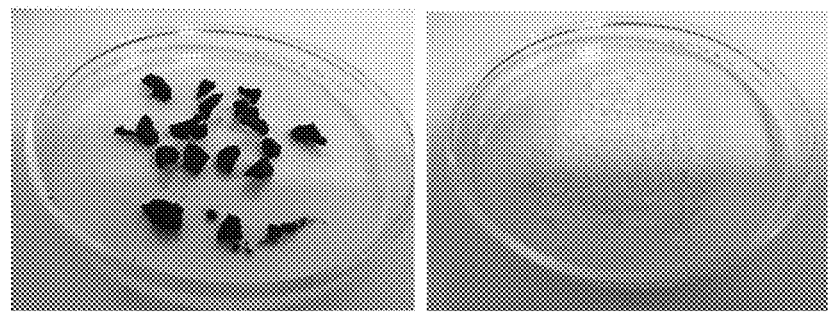
FIG. 2 (a) Paraffin deposit    FIG. 2 (b) Calcium carbonate
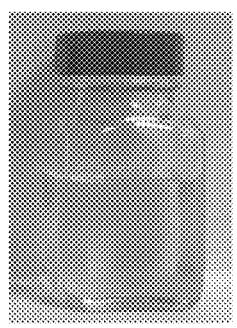 
FIG. 2 (c) Formulation 2    FIG. 2 (d) Formulation 2 after 3 hours in contact with solids

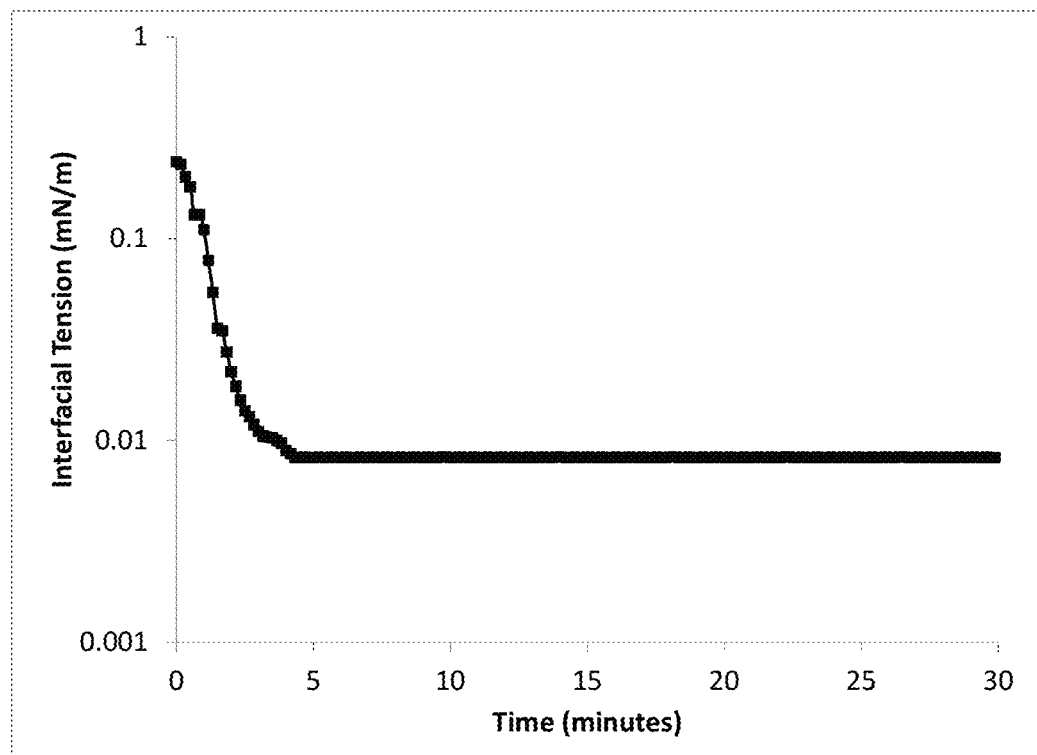
FIG. 3
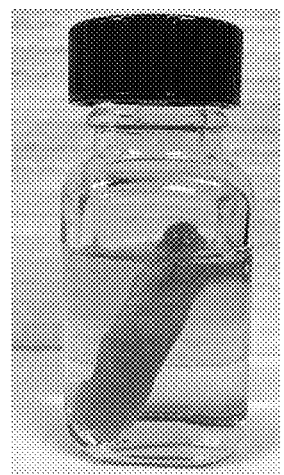 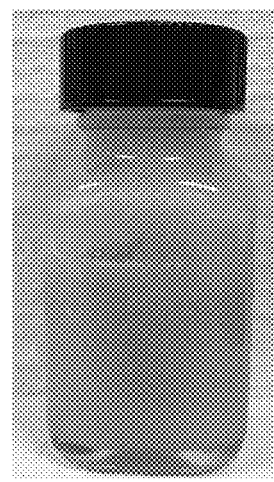
FIG. 4(a) Formulation 3 and organic solid deposit sample at initial contact
FIG. 4 (b) Formulation 3 and organic solid deposit after 3 hours of contact at 150°F (65.5°C)

METHOD FOR REMOVING ORGANIC AND INORGANIC DEPOSITS IN ONE STEP

CROSS-REFERENCE TO RELATED APPLICATION

This application claims the benefit of U.S. Provisional Patent Application No. 62/394,325 filed Sep. 14, 2016, incorporated herein by reference in its entirety.

TECHNICAL FIELD

The present invention relates to methods for removing organic and inorganic deposits; and more particularly relates, in one non-limiting embodiment, to methods for simultaneously removing organic and inorganic deposits during any well intervention after an oil and gas well is completed in one step.

TECHNICAL BACKGROUND

Crude oils and other heavier petroleum fractions often contain organic materials such as asphaltenes and paraffins. The major constituents of the paraffinic waxes contain long-chain normal alkyl regions. These waxy compounds readily crystallize out upon cooling of the oil fraction containing them. This cooling may result in deposits which obstruct the flow of hydrocarbon production fluids if the cooling occurs in a wellbore or a flowline such as a pipe or other conduit. These deposits must be removed from the wellbore to achieve continued and/or efficient production of petroleum. These deposits may also occur in the near-wellbore region of the formation, and these deposits are often a combination of paraffins, asphaltenes, emulsion, and/or inorganic scale.

Asphaltene deposits in the wellbore also cause problems and must be removed. Asphaltenes are organic materials consisting of aromatic and naphthenic ring compounds containing nitrogen, sulfur and oxygen molecules. The asphaltene fraction of crude may be defined as the organic part of the oil that is not soluble in straight-chain solvents such as pentane or heptane. Asphaltenes may exist as a colloidal suspension stabilized by resin molecules (e.g. aromatic ring systems) in the oil. The asphaltenes may precipitate as a result of a number of effects or factors including, but not necessarily limited to, pressure drop, shear forces (turbulent flow), acids, solution carbon dioxide ($CO_2$), mixing of incompatible crude oils, injected condensate, or other conditions or materials that break or disturb the stability of the asphaltic dispersion. Asphaltene deposits may occur in the near-wellbore region of a subterranean formation, well production tubing, valves and chokes, flowlines, risers, surface treating vessels, and storage tanks.

Besides these organic deposits, inorganic deposits may also cause concerns. Inorganic deposits are mainly salts that precipitate due to an incompatible mix of salt-containing water and other chemicals including, but not necessarily limited to sulfate salts, carbonate salts, halide salts, and combinations of these which can cause problematic scales which can also obstruct hydrocarbon flow in the wellbore and the near-wellbore region of the formation.

Various methods for removing paraffin wax have been utilized in the past. Sulfur trioxide has been used to contact the paraffin and form a dispersible material that is removed with an aqueous liquid and a surfactant. Other solvents and dispersants such as a copolymer of a primary alcohol and ethylene oxide with sodium silicate and N-substituted succinimide ethers have been tried. U.S. Pat. No. 4,813,482 teaches injecting a mixture of an alkyl or aralkyl polyoxyalkylene phosphate ester surfactant in free acid form or as a salt with a mutual solvent and water to remove paraffin deposits. This mixture must be at a temperature greater than the melting point of the wax to be effective. These processes do not melt the wax; they can only slowly eat away at its surface. This is typically not fast enough for economic deposit removal at most realistic surface-to-volume ratios. Furthermore, they create dispersions in water which must be disposed of or otherwise expensively dealt with.

U.S. Pat. No. 4,755,230 teaches the use of inorganic nitrate/nitrite compounds in redox reactions which result in an exotherm which melts the paraffin deposit and generates nitrogen gas. This technique does melt the wax, but requires the use of water to deliver the reactants, so that if the wax disperses at all, which it may well not, it does so into water which then must be expensively dealt with. Furthermore, gas generating redox reactions tend to be self-accelerating, rendering them at best kinetically unpredictable, and at worst explosive.

Methods for removing paraffin wax deposits from the surfaces of hydrocarbon (oil and/or gas) production equipment during oil production by melting and subsequently dispersing the deposits are also described in U.S. Pat. No. 5,484,488. These methods utilize an acid compound and a neutralizer compound which react exothermally to melt the deposit and form a dispersant to remove the melted fragments of the deposit. Examples of acids used in this method include $H_3PO_4$, $H_2SO_4$, and HCl, whereas examples of neutralizers used include NaOH, KOH, MgO, $MgCO_3$ and $NaHCO_3$.

It would thus be desirable to discover a new method and/or composition to remove organic deposits such as paraffins, asphaltenes and other types of undesired deposits and impediments from wellbore and the near-wellbore region of a subterranean formation, for instance inorganic deposits and the like that may be easily implemented. Because each wellbore procedure is costly and time consuming, it would be desirable to simultaneously remove both organic deposits and inorganic deposits in one step instead of in two or more separate steps.

SUMMARY

In one non-limiting embodiment there may be provided a method for removing organic deposits from a wellbore that involves contacting the organic deposits in the wellbore with a single phase fluid for an amount of time effective to disperse the organic deposits. The single phase fluid includes, but is not necessarily limited to, at least one solvent, at least one surfactant, and at least one co-solvent. The method additionally includes at least partially removing the organic deposits from the wellbore.

There is provided in one non-restrictive version, a method for simultaneously removing organic deposits and inorganic deposits from a wellbore, which method includes contacting the organic deposits and inorganic deposits in the wellbore with a single phase fluid for an amount of time effective to simultaneously disperse the organic deposits and dissolve the inorganic deposits. The single phase fluid includes, but is not necessarily limited to, at least one solvent, at least one surfactant, at least one co-solvent, and at least one scale dissolver. The method additionally involves simultaneously at least partially removing the organic deposits and inorganic deposits from the wellbore.

BRIEF DESCRIPTION OF THE DRAWINGS

FIG. 1(a) is a photograph of a water drop on a surface coated with a paraffin deposit showing a contact angle of 100.5°;

FIG. 1(b) is a photograph of a water drop on a surface initially coated with a paraffin deposit and subsequently cleaned with a stand-alone solvent for paraffin cleanup, showing a contact angle of 82.2°;

FIG. 1(c) is a photograph of a water drop on a surface initially coated with a paraffin deposit and subsequently cleaned with Formulation 2 described herein, showing a contact angle of 8.0°;

FIG. 2(a) is a photograph of a paraffin deposit;

FIG. 2(b) is a photograph of granular calcium carbonate representing scale;

FIG. 2(c) is a photograph of single phase Formulation 2;

FIG. 2(d) is a photograph of the single phase Formulation 2 of FIG. 2(c) showing that the organic deposit (paraffins) and inorganic solids (calcium carbonate) were completely dissolved;

FIG. 3 is a plot of interfacial tension profile of Formulation 1 in contact with a crude oil as a function of time;

FIG. 4 (a) is a photograph of a single phase Formulation 3 in contact with an organic solid deposit sample at an initial condition; and FIG. 4 (b) is a photograph showing the complete dissolution of the solid organic deposit after 3 hours of contact with Formulation 3 at 150° F. (65.5° C.).

DETAILED DESCRIPTION

A method has been discovered for simultaneously removing undesirable deposits, such as organic deposits and inorganic deposits, from wellbores and the near wellbore region of subterranean formations. Organic deposits that may be removed by the methods herein include, but are not necessarily limited to, paraffins, asphaltenes, tar, sludge, schmoo, and combinations of these. "Tar" includes, but is not necessarily limited to tar mats and tar mat materials that are present in some reservoirs and near-wellbore regions of wells which can impair production. These deposits may also occur in combinations with emulsions, inorganic scale, corrosion products, and bacteria. Schmoo is an informal "catchall" phrase for slimy, oily substances or deposits that adhere to almost any surface it contacts, and which is difficultly removed. As noted, inorganic deposits are typically salts that precipitate due to an incompatible mixing of salt-containing water and other chemicals including, but not necessarily limited to sulfate salts, carbonate salts, halide salts, and combinations of these which can cause problematic scales which can also obstruct hydrocarbon flow in the wellbore and the near-wellbore region of the formation.

Because the fluid is a single phase it is stable and thus does not separate upon storage, handling or use. Further, because the fluid is a single phase fluid it can be injected, pumped or otherwise introduced into the wellbore and near-wellbore regions of the subterranean formation in one step without having to use two or more fluids which are immiscible with each other and which would not form a single phase fluid and thus be unsuitable for and impossible to use in a one-step process.

Generally, suitable solvents include, but are not necessarily limited to, organic solvents, aromatic solvents, aliphatic solvents, naphthenic solvents, and mixtures of these solvents which are good for dispersing paraffins and asphaltenes, and forming dispersions of paraffins and asphaltenes. The solvents may be naturally occurring or synthetic. More specific, non-limiting examples of suitable dispersions include, but are not limited to: light aliphatic solvents with carbon numbers between $C_6$ and $C_{15}$; light aromatic solvents composed of isomers of $C_9H_{12}$; heavy aromatic solvent primarily composed of $C_{10}$ aromatic (CAS number 64742-94-5); and combinations thereof, and the like. Other solvents include, but are not limited to, terpenes, ionic liquids, synthetic solvents such as methyl ester solvents and solvents produced by metathesis catalyst technology.

Suitable surfactants for the single phase additive fluid include, but are not necessarily limited to, nonionic surfactants having an HLB between about 9 and about 14, for instance alkoxylated surfactants, such as alkoxylated alcohols, where the alkoxy groups are ethoxy groups, propoxy groups or mixtures thereof. Other nonionic surfactants include polymeric alkoxylates, polyglucosides, sorbitan esters, amine oxide, and alkanolamides. Other suitable surfactants include, but are not necessarily limited to anionic surfactants which may include but are not necessarily limited to oxyalkylated ether sulfates, alkyl aryl sulfates, disulfonates, sulfosuccinates, sulfonates (e.g. sulfonated amines and salts thereof), and carboxylates, cationic surfactants, and mixtures thereof, again where the alkoxy groups are ethoxy groups, propoxy groups or mixtures thereof. Other suitable surfactants include, but are not limited to gemini surfactants, betaines, amino-acids such as (including, but not limited to cocoyl glutamate), cationic surfactants, such as quaternary ammonium compounds (e.g. polyglycol ether ammonium methyl chloride).

Suitable co-solvents for the single phase additive fluid include, but are not necessarily limited to, glycol ethers, which can include, but are not necessarily limited to, ethylene glycol mono-butyl ether, dipropylene glycol monomethyl ether, propylene glycol ethers, methyl 2-pyrrolidone, as well as other co-solvents such as methanol, isopropyl alcohol, butanol, pentanol, hexanol, isooctyl alcohol and their isomers, C1-C8 alcohol blends, and the like, and mixtures thereof.

Suitable scale dissolvers for the single phase additive fluid include, but are not necessarily limited to, in-situ acids and already-formed acids, in particular hydrochloric acid, acetic acid, phosphoric acid, formic acid, hydrofluoric acid, citric acid, uric acid, synthetic acid (obtained by a combination of urea and hydrogen chloride) and the like, and blends of these acids. In-situ acids are defined herein as acids generated in-situ in the wellbore.

Generally, the solvents for the organic deposits are hydrophobic and the scale dissolvers are hydrophilic. By using appropriate surfactants (which are very hydrophilic) and co-solvents (which are mainly hydrophilic), and appropriate amounts of these surfactant and co-solvents, the solvents and the scale dissolvers may be all combined together into a stable, single phase fluid. By "stable" is meant that the single phase fluid does not separate into different phases over time upon standing, handling, and/or use. If once the single phase fluid is introduced into the wellbore and contacts the organic deposits and inorganic deposits, then it is acceptable, although not necessary, for the components of the fluid to phase separate prior to being removed from the wellbore along with the dispersed organic deposits and dissolved inorganic deposits.

In an embodiment where there are no inorganic deposits or the inorganic deposits need not be removed, the scale dissolver may be omitted from or absent from the single phase fluid.

In one non-limiting embodiment, the components of the single phase fluid have the following proportions: between about 5 independently to about 40 wt % at least one solvent, between about 5 independently to about 25 wt % at least one surfactant, between about 5 independently to about 30 wt % co-solvent, and between about 0.1 independently to about 35 wt % scale dissolver. Alternatively the components of the single phase fluid have the following proportions: between about 10 independently to about 20 wt % at least one solvent, between about 7 independently to about 15 wt % at least one surfactant, between about 10 independently to about 20 wt % co-solvent, and between about 5 independently to about 15 wt % scale dissolver. The term "independently" as used herein with respect to a range means that any lower threshold may be combined with any upper threshold to provide a suitable alternative range.

The contact time between the single phase fluid and the organic deposits and inorganic deposits may suitable range from about 5 minutes independently to about 72 hours, alternatively from about 30 minutes independently to about 24 hours; in another non-limiting embodiment from about 1 hour independently to about 15 hours; and in another non-restrictive version from 2 hours to 48 hours. It will be appreciated that the goal is to fully contact the single phase fluid with the organic deposits and inorganic deposits as much as possible. This contact disperses the organic deposits into the fluid and dissolves the inorganic deposits simultaneously. Then the organic deposits and inorganic deposits are at least partially removed from the wellbore along with the fluid, which may or may not remain single phase. While complete removal of the organic deposits and inorganic deposits is desired, it will be appreciated that as a practical matter only partial removal may be possible. For instance, given that contacting the deposits occurs within a wellbore, it can be difficult at such a distance to fully contact all of the deposits with the single phase fluid as a practical matter.

Other components that may be included in the single phase fluid besides those already discussed include, but are not necessarily limited to, brine (including, but not necessarily limited to KCl brines, NaCl brines, $CaCl_2$ brines, $ZnCl_2$ brines, bromide brines, formate brines and the like), dispersants, wax inhibitors, asphaltene inhibitors, defoamers, corrosion inhibitors, hydrate inhibitors, and combinations thereof.

The invention will now be described with respect to certain Examples which are provided to further illustrate the invention, but not necessarily limit it in any way

EXAMPLES

The selection of a solvent that is efficient to dissolve paraffins and asphaltenes is important in order for the formulation to be able to achieve good cleaning of paraffins and asphaltenes deposits. When these solvents are used as stand-alone fluids, they produce good cleaning of paraffins and asphaltenes deposits; however, the wettability alteration damage mechanism caused by paraffins and/or asphaltenes is not treated or addressed by these stand-alone solvents.

The role of the surfactant and co-solvents in the single phase fluids described herein is to get the immiscible components (i.e. solvent and scale dissolver diluted in water) into a single-phase fluid. The presence of very hydrophilic surfactants in the single-phase fluid, turn the surface from oil-wet to water-wet at the same time that paraffins and asphaltenes are removed. Thus it eliminates the wettability alteration damage. This is demonstrated by the measurement of contact angle.

Contact angle is one of the common ways to measure the wettability of a surface. Wetting refers to the study of how a liquid deposited on a solid substrate spreads out or the ability of liquids to form boundary surfaces with solid states. The wetting is determined by measuring the contact angle formed between the liquids and the solid. In hydrocarbon wells where oil and water are available, the water-wet tendency is high with a small contact angle between the solid surface and water, while large contact angles (about 80° or more) correspond to oil-wet surfaces.

Examples are presented in FIG. 1 where:
(a) FIG. 1(a) shows the contact angle between a water drop and a surface coated with a paraffin deposit. The measured contact angle was 100.5°, which corresponds to surfaces that are completely oil-wet.
(b) FIG. 1(b) shows the contact angle between a water drop and a surface that was covered with paraffin deposit and then cleaned with the stand-alone solvent for paraffins cleanup. The contact angle was 82.2°. The results demonstrated that, even if the surface was free of paraffin deposit, the surface remained oil-wet after the cleaning process with the solvent.
(c) FIG. 1(c) shows the contact angle between a water drop and a surface that was covered with paraffin deposit and then cleaned with Formulation 2 (described below). The measured contact angle was 8.0° and the water droplet was spread over a larger area of the surface, which corresponds to the case where the surface is very water-wet.

The contact angle measured after treatment with Formulation 2 shows very similar contact angles compared to contact angles achieved after treatment with Formulation 1 described in Table I.

Table I presents two examples of single phase fluids as described herein, Formulations 1 and 2. Table II presents two additional, different examples of single phase fluids as described herein, Formulations 3 and 4.

TABLE I

Single Phase Fluids-Formulations 1 and 2

| Composition | Type | Formulation 1, % | Formulation 2, % |
|---|---|---|---|
| Glycol ether | co-solvent | 13.1 | 13.2 |
| Blend of polyoxyalkylene sulfate and alcohol ethoxylate | surfactant | 17 | 17 |
| Sulfonate amine salt | surfactant | 0.7 | 0.7 |
| Isooctyl alcohol | co-solvent | 1.1 | 1.1 |
| Aromatic solvent | solvent | 18 | 18 |
| Scale dissolver | acid | 0.1 | 15 |
| KCl brine | brine | 50 | 35 |

TABLE II

Single Phase Fluids-Formulations 3 and 4

| Composition | Type | Formulation 3, % | Formulation 4, % |
|---|---|---|---|
| Glycol ether | co-solvent | 9 | 9 |
| Blend of polyoxyalkylene sulfate and alcohol ethoxylate | surfactant | 16 | 16 |
| Sulfonate amine salt | surfactant | 0.5 | 0.5 |
| C1-C8 alcohol blend | co-solvent | 14.5 | 14.5 |
| Blend of aliphatic ($C_6$-$C_{15}$) and aromatic (isomers of $C_9H_{12}$) solvent | solvent | 14.3 | 14.4 |
| Scale dissolver | acid | 0.1 | 10 |
| KCl brine | brine | 45.6 | 35.6 |

The scale dissolver (e.g., acid blends used to dissolve carbonate scales) are hydrophilic components that are much more efficient in dissolving the scales when these are free of organic materials. For that reason, the combination of good solvents for organic material removal with the scale dissolver and surfactants in a single-phase fluid should and does produce a faster dissolution of the scales. When the single-phase fluid contacts the scale, this will remove the organic material and turn the surface of the scales more water-wet or hydrophilic.

A blend of paraffin deposit (shown alone in FIG. 2(a)) and calcium carbonate (representing scale, shown in granular form in FIG. 2(b)) in a ratio of 50/50 was placed in the single-phase fluid Formulation 2 (shown alone in FIG. 2(c)) to determine the effectiveness to disperse the paraffin and dissolve the calcium carbonate with the acid at the same time (i.e., in a single-step). A proportion by weight of 9/1 of Formulation 2/blend of paraffin and calcium carbonate was used.

FIG. 2(d) shows that the organic deposit (paraffins) and inorganic solids (calcium carbonate) were completely dispersed and dissolved after 3 hours at room temperature (about 72° F.; about 22° C.). Then, the sample shown in FIG. 2(d) was filtered using a filter paper to determine the percentage of residual solid.

The results showed that all the calcium carbonate was dissolved. Only 20% of the paraffin colloid particles were retained in the filter paper.

One additional property of the single-phase fluids described herein is their very low interfacial tension (IFT) when contacted with crude oil or organic materials. The IFT ranges between $10^{-2}$ and $10^{-3}$ mN/m, depending on the crude oil or organic material contacted, which is two orders of magnitude lower than the IFT of the stand-alone solvents with water or scale dissolver with crude oils. FIG. 3 shows the IFT profile of Formulation 1 in contact with a crude oil. The low IFT results in higher solubilization of organic material, which produces a fast dispersion of the organic deposits, as well the breaking of sludge and viscous damaging emulsions.

With respect to the effect of temperature on the methods and compositions described herein: the single phase fluid is able to disperse paraffin and asphaltenes deposits at ambient temperature (about 72° F.; about 22° C.), and the effectiveness increased when temperature increased. For example, a sample of paraffins/asphaltenes blend was completely dispersed after 3 hours at 72° F. (22° C.). The second sample of the same organic deposit blend was completely dispersed after 1 hour at 200° F. (93° C.).

In another example, FIG. 4(a) shows that an organic solid deposit in contact with Formulation 3 at the initial contact. FIG. 4(b) shows that the organic solid deposit of FIG. 4(a) were completely dispersed and dissolved after 3 hours at 150° F. (about 65.5° C.) temperature.

In the foregoing specification, the invention has been described with reference to specific embodiments thereof, and has been described as effective in removing organic deposits and inorganic deposits from remote locations, such as from wellbores drilled into subterranean reservoirs and from the subterranean formations themselves (particularly the near wellbore part of the formation), but also including from downhole equipment, tubing, chokes, valves, separators, tanks, pipelines, and the like to remove deposits therefrom. However, it will be evident that various modifications and changes can be made thereto without departing from the broader scope of the invention as set forth in the appended claims. Accordingly, the specification is to be regarded in an illustrative rather than a restrictive sense. For example, specific combinations of solvents, surfactants, co-solvents, scale dissolvers, acids, dispersants, and other components falling within the claimed parameters, including contact methods and contact times, but not specifically identified or tried in a particular method or composition, are anticipated to be within the scope of this invention. Furthermore, deposits and reaction and contact conditions other than those specifically exemplified herein are expected to be useful for the methods and compositions described herein.

The present invention may suitably consist of or consist essentially of the elements disclosed and may be practiced in the absence of an element not disclosed. In one non-limiting embodiment here is provided a method for removing organic deposits from a wellbore consisting essentially of or consisting of contacting the organic deposits in the wellbore with a single phase fluid for an amount of time effective to simultaneously disperse the organic deposits, where the single phase fluid comprises, consists essentially of, or consists of at least one solvent, at least one surfactant, and at least one co-solvent, where the method additionally consists essentially of or consists of at least partially removing the organic deposits from the wellbore.

In another non-restrictive instance, in a non-limiting instance, the method for simultaneously removing organic deposits and inorganic deposits from a wellbore consists of or consists essentially of contacting the organic deposits and inorganic deposits in the wellbore with a single phase fluid for an amount of time effective to simultaneously disperse the organic deposits and dissolve the inorganic deposits, where the single phase fluid comprises, consists essentially of, or consists of at least one solvent, at least one surfactant, at least one co-solvent, and at least one scale dissolver; and where the method further consists of or consists essentially of simultaneously at least partially removing the organic deposits and inorganic deposits from the wellbore.

As used herein, the terms "comprising," "including," "containing," "characterized by," and grammatical equivalents thereof are inclusive or open-ended terms that do not exclude additional, unrecited elements or method acts, but also include the more restrictive terms "consisting of" and "consisting essentially of" and grammatical equivalents thereof. As used herein, the term "may" with respect to a material, structure, feature or method act indicates that such is contemplated for use in implementation of an embodiment of the disclosure and such term is used in preference to the more restrictive term "is" so as to avoid any implication that other, compatible materials, structures, features and methods usable in combination therewith should or must be, excluded.

As used herein, the singular forms "a," "an," and "the" are intended to include the plural forms as well, unless the context clearly indicates otherwise.

As used herein, the term "and/or" includes any and all combinations of one or more of the associated listed items.

As used herein, relational terms, such as "first," "second," "top," "bottom," "upper," "lower," "over," "under," etc., are used for clarity and convenience in understanding the disclosure and accompanying drawings and do not connote or depend on any specific preference, orientation, or order, except where the context clearly indicates otherwise.

As used herein, the term "substantially" in reference to a given parameter, property, or condition means and includes to a degree that one of ordinary skill in the art would understand that the given parameter, property, or condition is met with a degree of variance, such as within acceptable manufacturing tolerances. By way of example, depending on the particular parameter, property, or condition that is substantially met, the parameter, property, or condition may be at least 90.0% met, at least 95.0% met, at least 99.0% met, or even at least 99.9% met.

As used herein, the term "about" in reference to a given parameter is inclusive of the stated value and has the meaning dictated by the context (e.g., it includes the degree of error associated with measurement of the given parameter).

What is claimed is:

1. A method for removing organic solid asphaltene deposits from a wellbore comprising:
    contacting the organic solid asphaltene deposits in the wellbore with a single phase fluid for an amount of time effective to turn surfaces of the organic solid asphaltene deposits from oil-wet to water-wet and to disperse the organic solid asphaltene deposits, where the single phase fluid consists of:
        a solvent consisting of at least one aromatic solvent and at least one naphthenic solvent;
        at least one surfactant selected from the group consisting of:
            anionic surfactants selected from the group consisting of oxyalkylated ether sulfates, alkyl aryl sulfates, and carboxylates,
            gemini surfactants, betaines, and combinations thereof;
        at least one co-solvent;
        at least one scale dissolver in water; and
        at least one component selected from the group consisting of brine, dispersants, wax inhibitors, asphaltene inhibitors, defoamers, corrosion inhibitors, hydrate inhibitors, and combinations thereof;
        where the at least one surfactant is present in the at least one solvent; and
    at least partially removing the organic solid asphaltene deposits from the wellbore.

2. The method of claim 1 where the organic solid asphaltene deposits comprise asphaltenes, paraffins, and combinations thereof.

3. The method of claim 1 where:
    the at least one co-solvent is selected from the group consisting of glycol ethers, methyl 2-pyrrolidone, methanol, isopropyl alcohol, butanol, pentanol, hexanol, isooctyl alcohol and their isomers, blends of C1-C8 alcohols and combinations thereof.

4. The method of claim 1 where the single phase fluid comprises:
    between about 5 and about 40 wt % of the at least one solvent;
    between about 5 and about 25 wt % of the at least one surfactant; and
    between about 5 and about 30 wt % of the at least one co-solvent;
    based on the single phase fluid.

5. The method of claim 1 where the single phase fluid comprises:
    between about 10 and about 20 wt % of the at least one solvent;
    between about 7 and about 15 wt % of the at least one surfactant; and
    between about 10 and about 20 wt % of the at least one co-solvent;
    based on the single phase fluid.

6. The method of claim 1 where the amount of time ranges between about 5 minutes to about 72 hours.

7. The method of claim 1 where the amount of time ranges between about 1 hour to about 24 hours.

8. A method for simultaneously removing organic solid asphaltene deposits and inorganic solid deposits from a wellbore comprising:
    contacting the organic solid asphaltene deposits and inorganic solid deposits in the wellbore with a single phase fluid for an amount of time effective to turn surfaces of the organic solid asphaltene deposits from oil-wet to water-wet and to simultaneously disperse the organic solid asphaltene deposits and dissolve the inorganic solid deposits, where the single phase fluid consists of:
        a solvent consisting of at least one aromatic solvent and at least one naphthenic solvent;
        at least one surfactant selected from the group consisting of:
            anionic surfactants selected from the group consisting of oxyalkylated ether sulfates, alkyl aryl sulfates, and carboxylates,
            gemini surfactants, betaines, and combinations thereof,
        where the at least one surfactant is present in the at least one solvent;
        at least one co-solvent selected from the group consisting of glycol ethers, methyl 2-pyrrolidone, methanol, isopropyl alcohol, butanol, pentanol, hexanol, isooctyl alcohol and their isomers, blends of C1-C8 alcohols and combinations thereof;
        at least one scale dissolver in water; and
        at least one component selected from the group consisting of brine, dispersants, wax inhibitors, asphaltene inhibitors, defoamers, corrosion inhibitors, hydrate inhibitors, and combinations thereof; and
    simultaneously at least partially removing the organic solid asphaltene deposits and inorganic solid deposits from the wellbore.

9. The method of claim 8 where:
    the organic solid asphaltene deposits comprise asphaltenes, paraffins, and combinations thereof; and
    the inorganic solid deposits comprise scale precipitated from salts, where the salts comprise sulfate salts, carbonate salts, halide salts, and mixtures thereof.

10. The method of claim 8 where:
    the at least one scale dissolver is an in-situ acid and/or an already-formed acid selected from the group consisting of hydrochloric acid, acetic acid, phosphoric acid, formic acid, hydrofluoric acid, citric acid, uric acid, synthetic acid obtained by a combination of urea and hydrogen chloride, and blends of these acids.

11. The method of claim 8 where the single phase fluid comprises:
    between about 5 and about 40 wt % of the at least one solvent;
    between about 5 and about 25 wt % of the at least one surfactant;
    between about 5 and about 30 wt % of the at least one co-solvent; and
    between about 0.1 and about 35 wt % of the at least one scale dissolver;
    based on the single phase fluid.

12. The method of claim 8 where the single phase fluid comprises:
    between about 10 and about 20 wt % of the at least one solvent;
    between about 7 and about 15 wt % of the at least one surfactant;
    between about 10 and about 20 wt % of the at least one co-solvent; and between about 5 and about 15 wt % of the at least one scale dissolver;

based on the single phase fluid.

13. The method of claim 8 where the amount of time ranges between about 5 minutes to about 72 hours.

14. The method of claim 8 where the amount of time ranges between about 1 hour to about 24 hours.

15. A method for simultaneously removing solid asphaltene organic deposits and inorganic solid deposits from a wellbore comprising:
   contacting the organic solid asphaltene deposits and inorganic solid deposits in the wellbore with a single phase fluid for an amount of time effective to turn surfaces of the organic solid asphaltene deposits from oil-wet to water-wet and to simultaneously disperse the organic solid asphaltene deposits and dissolve the inorganic solid deposits, where the single phase fluid consists of:
      between about 5 and about 40 wt % of a solvent consisting of at least one aromatic solvent and at least one naphthenic solvent;
      between about 5 and about 25 wt % of at least one surfactant selected from the group consisting of:
         anionic surfactants selected from the group consisting of oxyalkylated ether sulfates, alkyl aryl sulfates, and carboxylates,
         gemini surfactants, betaines, and
         combinations thereof,
         where the at least one surfactant is present in the at least one solvent;
      between about 5 and about 30 wt % of at least one co-solvent selected from the group consisting of glycol ethers, methyl 2-pyrrolidone, methanol, isopropyl alcohol, butanol, pentanol, hexanol, isooctyl alcohol and their isomers, blends of C1-C8 alcohols and combinations thereof;
      between about 0.1 and about 35 wt % of at least one scale dissolver in water, that is an in-situ formed acid and/or an already-formed acid selected from the group consisting of hydrochloric acid, acetic acid, phosphoric acid, formic acid, hydrofluoric acid, citric acid, uric acid, synthetic acid obtained by a combination of urea and hydrogen chloride, and blends of these acids; and
      at least one component selected from the group consisting of brine, dispersants, wax inhibitors, asphaltene inhibitors, defoamers, corrosion inhibitors, hydrate inhibitors, and combinations thereof; and
   simultaneously at least partially removing the organic solid asphaltene deposits and inorganic solid deposits from the wellbore.

16. The method of claim 15 where:
   the organic solid asphaltene deposits comprise asphaltenes, paraffins, and combinations thereof; and
   the inorganic solid deposits comprise scale precipitated from salts, where the salts comprise sulfate salts, carbonate salts, halide salts, and mixtures thereof.

17. The method of claim 15 where the single phase fluid comprises:
   between about 10 and about 20 wt % of the at least one solvent;
   between about 7 and about 15 wt % of the at least one surfactant;
   between about 10 and about 20 wt % of the at least one co-solvent; and
   between about 5 and about 15 wt % of the at least one scale dissolver;

based on the single phase fluid.

18. The method of claim 15 where the amount of time ranges between about 5 minutes to about 72 hours.

19. The method of claim 15 where the amount of time ranges between about 1 hour to about 48 hours.

* * * * *